Patented Nov. 28, 1950

2,531,440

UNITED STATES PATENT OFFICE 2,531,440

LUBRICANTS

John W. Jordan, Pittsburgh, Pa., assignor to National Lead Company, New York, N. Y., a corporation of New Jersey No Drawing. Application March 29, 1947,
Serial No. 738,233

7 Claims. (Cl. 252—28)

This invention relates to lubricants and more particularly to the bodied types including those lubricants generally embraced by the term "greases."

In the production of bodied lubricants it is customary to prepare solutions or dispersions of soaps in lubricating oils, the function of the soaps being to body up the oils to grease consistency. Soaps commonly used for this purpose are the metal salts of long carbon chain saturated and unsaturated fatty acids, as for example, potassium oleate, magnesium stearate, aluminum palmitate, etc., although salts of aromatic-acids, such as lead naphthenate, are also useful. It is commonly observed that lubricants consisting of these soap-in-oil dispersions have a relatively high thermal coefficient of viscosity and that at temperatures often encountered in machinery under normal operating conditions these greases become fluid, resulting in lss of the lubricant and damage to the machinery. This is to a considerable extent a function of the melting point of the soap. Thus the magnesium, zinc or aluminum soaps would not be suitable for high temperature applications because of their low melting points. The alkali soaps, while possessing higher melting points, up to 175° C., are subject to hydrolysis by moisture, which gives rise to deleterious alkalinity, and are therefore not entirely suited to some conditions of use. Other additives such as clay and asphaltic materials are sometimes used to increase the load bearing capacity and the high temperature viscosity of greases; the clays, however, introduce abrasive material, and the organic bodying agents increase the low temperature consistency to such a degree that starting of cold machinery is difficult.

Although certain colloidal clays, chiefly bentonites, when placed in water will swell to many times their dry volumes and in so doing will form gels or pastes of high consistency useful either without further treatment or in mixture with other materials to form, in some cases, emulsions, gels embodying this invention may be obtained in liquids other than water. The aforementioned gels of bentonite in water are subject to drying, shrinking, and cracking by reason of evaporation of the liquid phase, and similarly, emulsions of organic liquids or solids in aqueous bentonite gels exhibit this same defect upon being exposed to the atmosphere for any appreciable length of time. The effectiveness of such preparations is, therefore, limited.

It has been known that a clay mineral such as montmorillonite, originally exhibiting a substantial base-exchange capacity, can be reacted with an organic compound such as an amine so that the clay cation will be replaced by a substituted cation of the organic compound in order to form a water-repellent product. However, such products as heretofore proposed have no substantial gel-forming characteristic in an organic liquid and they are substantially non-swelling. Thus, the reaction products of propyl, butyl and octyl amines, containing from 3 to 8 carbon atoms, with sodium bentonite swell only from 5 ml. to 7 ml. when 2 grams of the product are dispersed in nitrobenzene. Such products are, therefore, applicable only where a compound having no exceptionally high gelling properties in an organic liquid is needed.

One of the objects of this invention is to provide a novel bodied lubricant.

Another object is to provide such a lubricant having a low thermal coefficient of viscosity.

A further object is to provide a load bearing grease, which while of good grease consistency at low temperatures, will not flow or run at higher temperatures.

Another object is to provide a process of making bodied lubricants of the character described.

Further objects will appear from the detailed description in which will be set forth a number of embodiments of this invention; it is to be understood, however, that this invention is susceptible of various embodiments within the scope of the appended claims.

Generally stated and in accordance with illustrative embodiments of this invention, the bodied lubricant comprises an organic lubricating liquid and a modified clay, originally exhibiting a substantial base-exchange capacity (of at least 25) in which the exchangeable inorganic cation has been replaced by an onium base of the character hereinafter described, of such a configuration as to make the surface of the clay particle organophilic and to an extent sufficient, to form an onium clay having a substantial gelling characteristic in the organic liquid (viz. swelling to at least eight fold in nitrobenzene), colloidally dispersed in the liquid. In the making of these bodied lubricants, the modified clay of the type having the gelling characteristics described is colloidally dispersed in the organic lubricating liquid in a manner to obtain a gel and for this purpose, the dispersion may be accomplished in a manner hereinafter described.

The clays which are useful as starting materials for making the modified clay in accordance with this invention are those exhibiting substantial base-exchange properties, and particularly those exhibiting comparatively high base-exchange properties and containing cations capable of more or less easy replacement. The clays particularly contemplated by the specification and the claims, include the montmorillonites, viz., sodium, potassium, lithium and other bentonites, particularly of the Wyoming type; magnesium bentonite (sometimes called hectorite) and saponite; also nontronite and attapulgite, particularly that of the Georgia-Florida type. These clays, characterized by an unbalanced crystal lattice, are believed to have negative charges which are normally neutralized by inorganic cations. As found in nature, therefore, they exist as salts of the weak clay-acid with bases such as the alkali- or alkaline-earth metal hydroxides. Bentonites which are particularly useful are the swelling bentonites of the Wyoming type and the swelling magnesium bentonites of the hectorite type.

The base-exchange capacities of the various clays enumerated run from about 25 to about 100, based upon milliequivalents of exchangeable base per 100 grams of clay. The montmorillonites have comparatively high base-exchange capacities, viz., 60–100. Attapulgite has substantial base-exchange capacity, viz., 25–35. Generally, the clays of higher base-exchange capacities are particularly useful where high exchange of an organic base for the cation of the clay is desired.

More specifically, and in accordance with illustrative embodiments of this invention, a clay of the character described and exhibiting substantial base-exchange capacity, is reacted with an organic compound, more particularly one hereinafter generally defined and referred to as an "onium" compound, by the substitution for the clay cation of the cation of the organic compound, which cation is of a class hereinafter referred to as an "onium" base. This invention is not, however, restricted to the use of a reaction product of a base-salt with clay-salt, but includes the reaction product of a free base with an acid-clay.

An "onium" compound has been defined in Hackh's Chemical Dictionary, Second edition, as 'A group or organic compounds of the type RXH$_v$ which are isologs of ammonium and contain the element X in its highest positive valency, viz:

"Where X is pentavalent as in ammonium, phosphonium, arsonium, and stibonium; where X is tetravalent as in oxonium, sulfonium, selenonium and stannonium compounds; and where X is trivalent, as in iodonium compounds; and that they may be considered addition compounds of ammonium, carbonium, stibonium, c. f., -inium. -ilium."

A number of the compounds capable of reacting with clays, particularly bentonite, will be described; it is to be understood, however, that various other compounds reactable with clays of the character described, may be employed. These compounds may includes salts of aliphatic, cyclic, aromatic and heterocyclic amines, primary, secondary, and tertiary amines and polyamines, also quaternary ammonium compounds, as well as other monobasic or polybasic onium compounds, such as triphenylalkyl phosphonium or stibonium-halides, or dialkyl-, or diaryl-sulphonium and selenonium halides, and pyrones, such as 2,5-dimethyl gamma pyrone hydrochloride.

As previously mentioned, the untreated sodium bentonite in contact with water adsorbs large quantities of the water and swells, forming a gel. This swelling has been attributed to the lamellar structure of the clay mineral and to adsorption of water molecules onto the surfaces of the mineral sheets, thus giving rise to a separation of the sheets as the oriented water layers build up to an appreciable depth. If the surfaces of the clay laminae contain organic matter, as by the reaction of base-exchange with an organic base, the ability of water molecules to be adsorbed is eliminated, and the clay no longer exhibits its former swelling capacity in water. Thus, Wyoming bentonite, for example, which is essentially the sodium salt of montmorillonitic acid, is capable of reacting with organic bases or their salts, e. g., 1. 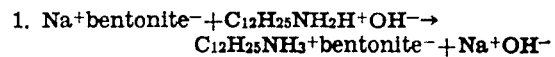

or more readily

2. 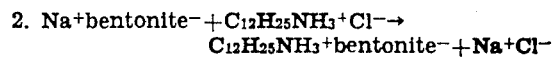

The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water. For example, it will swell in many organic liquids and will form stable gels and colloidal dispersions. Such gels are visually homogeneous and often transparent or translucent. They are thermally stable up to the boiling point of the liquid phase and show little tendency to flow or run when heated. The more dilute systems which are more or less liquid have viscosities much higher than those of the liquids themselves, and in most cases exhibit thixotropy characteristic of the analogous bentonite-water system.

The situation is analogous to the above if the element X of the onium compounds is other than nitrogen. The onium compound should, however, be such that the resultant onium-bentonite will have substantial swelling properties in organic liquids. Such swelling characteristic may be determined by introducing 2 grams of the onium-bentonite product into nitrobenzene and noting the amount of swelling in milliliters. Thus in the case of amine-bentonite products, the employment of salts of aliphatic amines, including the propyl, butyl and octylamines containing from 3 to 8 carbon atoms will produce an amine-bentonite product showing a swelling of from 5 to 7 ml. in nitrobenzene. There is, however, generally a distinct region of increase of swelling with amine-bentonites in which the amine has in excess of 10 carbon atoms. Thus, the swelling in nitrobenzene of corresponding amine-bentonites are found to be: decylamine-bentonite (10 carbon atoms), 36 ml.; dodecylamine-bentonite (12 carbon atoms), 50 ml.; this high swelling will hold through the series, viz., octadecadienylamine-bentonite (18 carbon atoms), 50 ml., a like relation being generally found for other onium-bentonites. Such products may, therefore, well be called "high-swelling" onium-bentonites.

The ratio of the onium compound, such as, for example, an amine compound, to bentonite, may be varied within certain limits in converting the bentonite to the organophilic condition.

In general, it is satisfactory to react the amine salt with the bentonite in the ratio of 100 milliequivalents of amine salt to 100 grams of bentonite, which is approximately the base-exchange capacity of the standard highly swelling sodium bentonites. In accordance with this invention, it is not necessary that the inorganic cation of the clay be completely replaced by the onium base; some of the objects and useful results of this invention may be obtained by partial replacement. Typical values of swelling on the above basis are listed below for a series of dodecylammonium-bentonites, in which the ratio of amine to bentonite was varied over wide limits:

| Amine/bentonite | 50 me./100 g. | 75/ | 100/ | 125/ | 150/ | 200/ | 300/ |
|---|---|---|---|---|---|---|---|
| Swelling in nitrobenzene; ml | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compound such as an amine compound, which when converted to the onium base form and reacted by base-exchange with the clay, is attached to certain points on the surface of the mineral, or to substitute the proper aliphatic chain in a polyammonium base. It has been found that a base with a molecular area of about 70 square angstrom units or a linear dimension of at least 14 angstrom units, for example, a primary amine with a chain of 10 carbon atoms, e. g., decyl amines will substantially fulfill the requirements of covering the clay surface. Other types of amines, however, may be used also, e. g., polyamines such as triethylenetetramine, aromatic amines such as naphthylamine, cyclic amines such as cyclohexylamine, heterocyclic amines such as pyridine, secondary amines such as diamylamine, tertiary amines such as lauryl dimethyl amine and quaternary ammonium compounds such as tetraethanolammonium hydroxide. An excess of organic matter as occasioned by use of an amine of area greater than 70 square Angstroms or a linear dimension of at least 14 Angstrom units, as, for example, octadecadienyl amine, is not detrimental to the gelling properties of the amine-bentonite composition. Good results, for instance, have been obtained with primary amines having hydrocarbon chains of twelve or more carbon atoms.

The type of clay mineral to be used may vary with the intended use. For optimum gelling properties, it is best to use a bentonite which exhibits good gelling properties in water. However, some non-swelling clays when converted to the onium salt form will swell in organic liquids and give rise to thixotropic colloidal dispersions.

It is to be understood that when reference is made to basic organic compounds such as amines, it is implied that before reacting with the clay by base-exchange, the amine is converted to the onium form either by the addition of acid or by reason of the fact that some part of the inorganic base in the naturally occurring clay consists of hydrogen. In the preparation of organic gels various methods may be followed. If it is desired to prepare a gel free from abrasive impurities, it may be advantageous to start with a dilute aqueous dispersion of bentonite and allow the non-bentonite impurities to settle out, or to remove them by super-centrifuging. By the latter method it is also possible to fractionate the clay into any desired particle size fraction. Thereafter, the purified bentonite dispersion is reacted with a salt of the desired amine or other basic organic compound. The flocculated onium bentonite is then filtered, dried, ground and mixed with the organic liquid which is to be bodied up. For rapidly accomplishing dispersion of the onium-bentonite in the organic liquid it is often advantageous to heat the mixture and pass it through a multiple-roll mill such as a paint mill or to add a small amount, viz., 5%, of a peptizing agent, such as ethyl acetate. However, the above dispersion aids may not be necessary for some combinations.

Where impurities associated with the clay are of no consequence, it is often sufficient merely to add the dry clay to the organic liquid containing sufficient amine salt or salts of other basic organic compound to more or less completely react with the clay. The gelling effect is thus enhanced by converting the amine to the salt form, or any of the other basic organic compounds to the onium form, either before or after the addition of the clay, by introduction of an acid such as hydrochloric or acetic acid. Further, it is also feasible to prepare a dry mixture, to be used in gel formation, by mixing the amine with dry clay and then mixing in the requisite amount of an acid such as acetic or by mixing the amine salt with the dry clay, thereafter adding the dry amine-bentonite mixture to the liquid with which it is desired to produce a gel.

Various examples of lubricants with superior flat viscosity characteristics over a wide range of temperatures will now be described, and while certain organic base bentonites will be chosen as the gelling agents, it will be understood that the invention is applicable to onium clay products in general.

*Example 1*

2750 g. of a Wyoming bentonite was dispersed in 70 liters of water and the slurry allowed to stand for two hours to settle out the non-clay impurities. About 10% of the weight of the bentonite was discarded in this process. 150 g. (2.5 mol) of glacial acetic acid was added to 663 g. (2.5 mol) of octadecadienylamine and the amine salt then dissolved in 4 liters of warm water. Flocculation of the bentonite occurred upon addition of the amine salt solution, and the flocculent precipitate was filtered, washed, dried and pulverized. The octadecadienylammonium bentonite as prepared was mixed with S. A. E. 60 lubricating oil to the extent of 40% by weight. This viscous paste, upon passage through a 3-roll paint mill, stiffened up due to dispersion of the organophilic bentonite as a result of mechanical action of the mill. After dilution of the system with oil to 20% concentration of the treated clay and upon gradual wetting of the solid surfaces by the oil with successive passes through the differential mill, a heavy translucent grease resulted. The consistency of this grease, as determined by a cone penetrometer according to the A. S. T. M.

procedure, varied from 286 at 1.5° C. to 337 at 154° C. At no temperature was any sign of melting or running observed. Octadecadienylamine has 18 carbon atoms in a chain, a linear dimension of 25 angstrom units, an area of 131 sq. angstrom units and 2 grams swell to 65 ml. in nitrobenzene, that is over 32 fold.

*Example 2*

2750 g. of a Wyoming bentonite was dispersed in 70 liters of water and the slurry allowed to stand for two hours to settle out the non-clay impurities. 150 g. (2.5 mol) of glacial acetic acid was added to 464 g. (2.5 mol) of dodecylamine and the amine salt then dissolved in 4 liters of warm water. Flocculation of the bentonite occurred upon addition of the amine salt solution, and the precipitate was filtered, washed, dried and pulverized. 150 g. of the dodecylammonium bentonite as prepared was added to 1000 g. of tricresyl phosphate and allowed to swell. The resulting mixture of brown translucent gel and clear liquid was stirred and passed through a 3-roll mill yielding a homogeneous translucent redbrown stiff paste of the consistency of vaseline. This paste exhibited a flash point of about 250° C. and lost its liquid phase at about 400° C. by distillation without melting or running. The material is well adapted to use as a high temperature lubricant. It may also be used as a packing in the ignition manifolds of aircraft engines, with no flashover evident at 31,000 volts. At a lower concentration it is useful as a hydraulic fluid because of its relatively slight variation in viscosity between −40° C. and 350° C. Dodecylamine has 12 carbon atoms in a chain, a linear dimension of 17 angstrom units, an area of 84 sq. angstrom units and 2 grams swell to 98 ml. in nitrobenzene, that is 49 fold.

*Example 3*

118 g. of Wyoming bentonite was dispersed in 3 liters of water and the slurry allowed to stand for 24 hours to settle out non-clay impurities. To the decanted dispersion was added a solution of 51 g. of triphenyllaurylphosphonium bromide in 95% ethanol. The well flocculated precipitate was readily washed, filtered, dried and pulverized to a bulky white powder. 75 g. of this powder was stirred into 425 g. of Dow Corning Silicone Fluid #702 a liquid siloxane linear polymer and the mixture heated for 1 hour at 150° C., after which the thick light colored mass was passed through a 3-roll mill yielding a light gray translucent grease of vaseline consistency. This grease exhibited excellent low and high temperature characteristics, with no pour point at any temperature. Triphenyllaurylphosphonium bromide has 12 carbon atoms in a chain, a linear dimension of 17 angstrom units, an area of 168 sq. angstrom units, and 2 grams swell to 65 ml. in nitrobenzene, that is over 32 fold.

*Example 4*

To a 3% aqueous dispersion of 100 g. of Wyoming bentonite was added an aqueous solution of 57.5 g. of dimethyldicetylammonium bromide. The well flocculated precipitate was readily washed, filtered, dried and pulverized. 100 g. of the resulting powder was stirred into 900 g. of S. A. E. 10 petroleum oil and the mixture heated for 1 hour at 150° C., during which time the mixture stiffened considerably. The yellow paste was then passed through a 3-roll mill producing a light olive colored translucent grease of chassis lube consistency. This grease exhibited no melting point and possessed excellent thermal stability. Dimethyldecetylammonium bromide has 16 carbon atoms in a chain, a linear dimension of 21 angstrom units, an area of 200 sq. angstrom units, and 2 grams swell to 65 ml. in nitrobenzene, that is over 32 fold.

As noted, each of the above mentioned lubricants possess superior and stable lubricating properties over a wide range of temperatures. The preparation of the lubricants is simple. Translated into practical terms, this invention allows greases to be economically produced which will not melt and run out of hot bearings or "freeze" at low temperatures.

It will be readily understood that the above illustrative embodiments are to be broadly interpreted and not to be taken as limiting the scope of the invention claimed.

The invention having thus been described, what is claimed is:

1. A bodied lubricant, comprising essentially, an organic lubricating liquid having colloidally dispersed therein a clay originally exhibiting a base-exchange capacity of at least 25, in which the exchangeable inorganic cation has been exchanged for an onium base of a type capable of and to an extent sufficient to form an onium-clay swelling to at least eight-fold in nitrobenzene.

2. A bodied lubricant, comprising essentially, an organic lubricating liquid having colloidally dispersed therein a bentonite originally exhibiting a base-exchange capacity of at least 60, in which the exchangeable inorganic cation has been exchanged for an onium base of a type capable of and to an extent sufficient to form an onium-bentonite swelling to at least eight-fold in nitrobenzene.

3. A bodied lubricant, comprising essentially, an organic lubricating liquid having colloidally dispersed therein an organophilic clay, originally exhibiting a base-exchange capacity of at least 25 in which the exchangeable inorganic cation has been exchanged for an onium ammonium base of a type capable of and to an extent sufficient to form an onium-clay swelling to at least eight-fold in nitrobenzene.

4. A bodied lubricant, comprising essentially, an organic lubricating liquid having colloidally dispersed therein an organophilic clay, originally exhibiting a base-exchange capacity of at least 25 in which the exchangeable inorganic cation has been exchanged for an onium phosphonium base of such molecular area and to an extent sufficient to form an onium-clay swelling to at least eight-fold in nitrobenzene.

5. A bodied lubricant, comprising essentially, an organic lubricating liquid having colloidally dispersed therein an organophilic clay, originally exhibiting a base-exchange capacity of at least 25 in which the exchangeable inorganic cation has been exchanged for an onium base of a molecular area of at least 70 square angstrom units.

6. A bodied lubricant, comprising essentially, an organic lubricating liquid having colloidally dispersed therein an organophilic clay, originally exhibiting a base-exchange capacity of at least 25 in which the exchangeable inorganic cation has been exchanged for an onium base having an organic radical with a linear dimension of at least 14 linear angstrom units.

7. A bodied lubricant, comprising essentially an organic lubricating liquid having colloidally dispersed therein an organophilic clay, originally exhibiting a base-exchange capacity of at least 25 in which the exchangeable inorganic cation has been exchanged for an onium-base having an aliphatic radical containing at least 10 carbon atoms in a chain.

JOHN W. JORDAN.

REFERENCES CITED

The following references are of record in the file of this patent:

UNITED STATES PATENTS

| Number | Name | Date |
|---|---|---|
| 1,517,577 | Olsson | Dec. 2, 1924 |
| 1,758,265 | Sherrick | May 13, 1930 |
| 2,033,856 | Smith | Mar. 10, 1936 |
| 2,348,639 | O'Brien | May 9, 1944 |
| 2,412,929 | Bogart et al. | Dec. 17, 1946 |